Nov. 26, 1935.  G. E. EVERITT  2,022,591
COMBINATION SERVICE TABLE, DRAIN AND CONVEYER
Filed Sept. 7, 1933
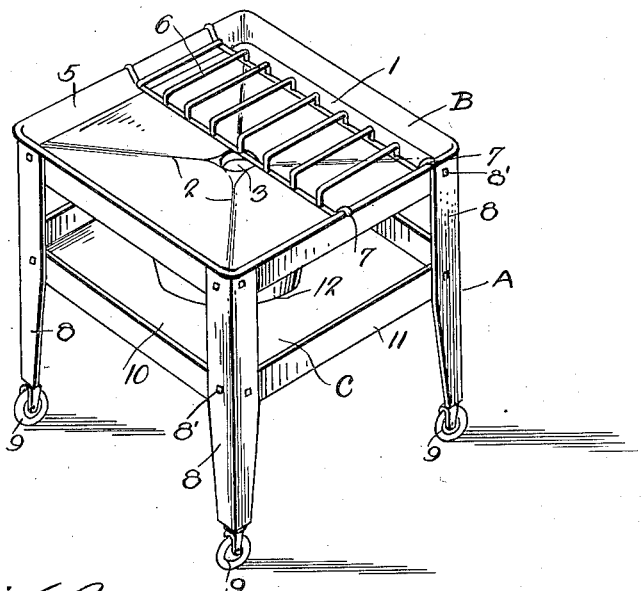
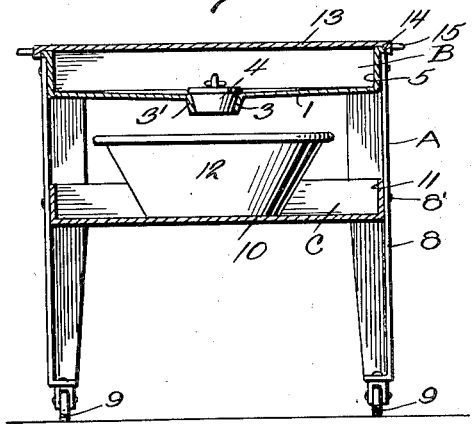
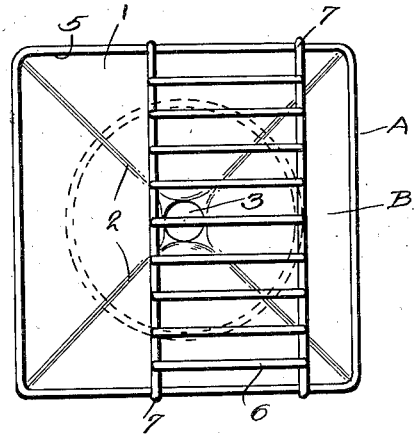
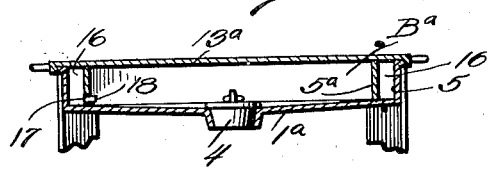
Inventor
George E. Everitt
By Shrive, Crown + Gordon
Attorneys Patented Nov. 26, 1935

2,022,591

UNITED STATES PATENT OFFICE 2,022,591

COMBINATION SERVICE TABLE, DRAIN, AND CONVEYER

George E. Everitt, Decatur, Ga.

Application September 7, 1933, Serial No. 688,520

1 Claim. (Cl. 312—167)

Generically this invention relates to service tables, but it more especially is directed to a portable type having in addition to other novel features a removable top and drain means.

One of the principal obects of this invention is the provision of a unique portable combination service table, drain and conveyer, adapted to convey dishes and hot foods from the kitchen to the dining room and to maintain same hot until served, and to drain and convey dishes from the dining room to the kitchen, and especially adapted for use in hospitals, hotels, restaurants, and the like.

Another important object of this invention is the provision of a portable combination service table having a sink-like upper portion including a dish rack for effecting rinsing, draining, and transporting dishes, said portion also constituting a compartment for the reception of hot dishes designed to maintain the same hot until served.

A further important object of this invention is the provision of a portable serving table including a combination drainage sink and compartment for foods and dishes, the latter adapted to contain and maintain same hot until served, the closure for said compartment not only constituting a removable cover, but a table top thereby rendering the device utilizable as a table, said top also constituting a tray upon which food may be placed for serving guests in the home, patients in a hospital, or for removing soiled dishes, in conjunction with or independently of the device proper, as desired.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a perspective view of my improved portable combination service table.

Fig. 2 is a vertical sectional view of Fig. 1 with the removable top in position and showing the drainage receptacle and plug in elevation.

Fig. 3 is a top plan view of Fig. 1.

Fig. 4 is a top plan view of the upper section of the device illustrating a modified form showing the heating chamber surrounding said section.

Further advantages of this invention over the devices now in use may be summarized as follows: Many steps are wasted in hotels, restaurants and private homes by carrying dishes to and from the dining room and from the kitchen sink to the cupboard. The present invention provides very simple, practical and novel means for saving these unnecessary steps and also for keeping the food warm while en route to its destination, and is especially adapted for carrying the soiled dishes, crumbs and left over foods from the table to the kitchen in one trip instead of a dozen or more. It may also be used as a sink and drain board for the rapid handling of dishes from the sink to the table or the china closet or cupboard. Hot dishes which are placed in the top of this device and covered will remain hot until served. When the device is used in a hospital or sick room, the top cover may be removed and will serve as a tray upon which the dishes containing the food can be placed. dishes are often broken in hotels and restaurants by the colliding of waiters as they pass through the swinging doors, and the use of this service table not only eliminates such accidents but permits the waiters to serve more patrons with food at the proper temperature. This device may be made in any desired size and shape, and while I have preferably shown it as square, it may be of any desired configuration, such as oblong, round, rectangular and the like.

In the illustrated embodiment characterizing this invention there is shown a combination portable service table A including a top section B comprising a bottom 1 slightly inclined downwardly as indicated by lines 2 from its edges to a center opening 3 formed therein. The bottom 1 is formed with a depending flange 3' forming a drainage spout and seat for plug 4, and is also formed along its edges with an integral upstanding flange constituting the sides 5. Said sides 5 and bottom 1 form the sink-like compartment or section B, in which dishes may be rinsed or washed, and when plug 4 is removed the bottom 1 constitutes a drain board.

A removable rack 6 formed at its ends with hooks 7 is adapted to be hooked over the top edges of opposite sides 5, for stacking or holding dishes set aside to drain.

In the present instance, at each of its four corners, top section B is supported on respective angle-iron legs 8, secured by bolts 8' or welded, riveted, or otherwise suitably secured thereto, and with their lower ends suitably and preferably mounted on rubber tired casters 9, so that the device may be easily and noiselessly moved from place to place. It is apparent that by employing bolts 8' the legs 8 may be removed to facilitate packing, shipping, etc.

Positioned beneath section B and in spaced relation with respect thereto, is a support C formed with a bottom 10 and sides 11 somewhat similar to section B and similarly or suitably secured to and forming a brace for legs 8. This support C is provided for the purpose of carrying a bucket, pan or other suitable container 12 into which the drainings from section B may enter through opening 3. When the device is not in use as a drain board, the receptacle or pan 12 may be removed and the support C employed for carrying dishes or other articles.

In order that the device A may be used in a conventional manner as a table, a top element 13 is adapted to be mounted on section B and is formed on its under surface with a circumferential bead or flange 14 for engagement over the edges of sides 5, which not only maintains the top in position, but effects a substantially air tight closure for section B. It is thus apparent that when hot foods or dishes are placed in compartment B, the top 13 constitutes a tight closure to maintain the same warm until served.

In addition to its other uses, top 13 may be utilized, independently of the device, as a tray for carrying dishes and serving food and the like, especially to invalids, and in order that it may be expeditiously carried, it is formed on opposite sides with suitable handles 15.

While the device has been preferably shown as square, formed of metal and with angle iron legs adapted to fit the corners of the sections B and C, and tapering from section C to their lower ends, yet it is to be understood that it may be constructed from any suitable material, and the shape of the legs and configuration of the device in general may be changed as desired without departing from the scope and spirit of the invention.

In some instances it may be desirable, especially in connection with the construction of the larger units for hotels, hospitals, and the like, having a greater hot food carrying capacity, and in connection with which it is often necessary to keep the food warm for a longer time than usual, to provide additional heating and heat retaining means in connection with section B, and which slightly modified structure is shown in Fig. 4.

The modified form of the invention illustrated in Fig. 4 is entirely similar to the preferred form illustrated in Fig. 1 except that the section B*a* has additional sides 5*a* parallelling sides 5 and spaced inwardly therefrom, welded, soldered or otherwise united with bottom 1*a* and forming in effect an insulating channel or chamber 16 surrounding the section or compartment B*a*, said chamber when closed by top closure element 13*a*, is adapted to contain a heating medium, such as hot water, hot coals or other means for heating and maintaining in a heated condition, hot dishes and foods contained in said chamber for substantially extended periods. An opening 17 is formed inside 5*a* adapted to be closed by a stop cock or plug 18 for draining chamber 16 and permitting the fluid contents thereof to flow into said section B*a*, and which may be utilized for rinsing and the like when said section is being used as a sink.

From the above it is apparent that I have designed a unique portable combination service table, drain and conveyer, simple in construction, manufacturable at a minimum of cost, versatile in its adaptation to a variety of uses, and efficient for the purposes intended.

Although in practice I have found that the form of my invention illustrated in the accompanying drawing and referred to in the above description as the preferred embodiment, is the most efficient and practical; yet realizing the conditions concurrent with the adoption of my device will necessarily vary, I desire to emphasize that various minor changes in details of construction, proportion, and arrangement of parts, may be resorted to within the scope of the appended claims without departing from or sacrificing any of the principles of this invention.

Having thus described my invention, what I desire protected by Letter Patent is as set forth in the following claim:

A portable service table comprising a combination sink and food carrying compartment, an insulating chamber surrounding said compartment adapted to contain hot water and the like and formed with an opening communicating with said compartment, a removable means normally closing said opening, a closure for said compartment and chamber constituting a table top and tray formed with a depending flange adapted for engagement over the upper edges of the compartment and formed with handles for carrying said closure when being used as a serving tray.

GEO. E. EVERITT.